United States Patent
Bauer et al.

(10) Patent No.: US 10,421,909 B2
(45) Date of Patent: *Sep. 24, 2019

(54) MIXED ALKALI-ALUMINUM PHOSPHITES, METHOD FOR PRODUCING SAME, AND THE USE THEREOF

(71) Applicants: Harald Bauer, Kerpen (DE); Sebastian Hoerold, Diedorf (DE); Martin Sicken, Cologne (DE)

(72) Inventors: Harald Bauer, Kerpen (DE); Sebastian Hoerold, Diedorf (DE); Martin Sicken, Cologne (DE)

(73) Assignee: Clariant International Ltd., Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,871

(22) PCT Filed: Nov. 28, 2012

(86) PCT No.: PCT/EP2012/004907
§ 371 (c)(1),
(2) Date: Jun. 4, 2014

(87) PCT Pub. No.: WO2013/083249
PCT Pub. Date: Jun. 13, 2013

(65) Prior Publication Data
US 2015/0018464 A1   Jan. 15, 2015

(30) Foreign Application Priority Data
Dec. 5, 2011   (DE) .................. 10 2011 120 218

(51) Int. Cl.
| | |
|---|---|
| *C09K 21/04* | (2006.01) |
| *C01F 7/00* | (2006.01) |
| *C01B 25/163* | (2006.01) |
| *C08K 3/32* | (2006.01) |
| *C08K 7/14* | (2006.01) |
| *C08K 5/56* | (2006.01) |

(52) U.S. Cl.
CPC ............ *C09K 21/04* (2013.01); *C01B 25/163* (2013.01); *C01F 7/00* (2013.01); *C08K 3/32* (2013.01); *C08K 5/56* (2013.01); *C08K 7/14* (2013.01); *C01F 7/007* (2013.01); *C01P 2004/61* (2013.01); *C01P 2006/11* (2013.01); *C01P 2006/62* (2013.01); *C01P 2006/63* (2013.01); *C01P 2006/64* (2013.01); *C01P 2006/82* (2013.01); *C08K 2003/324* (2013.01); *C08K 2003/327* (2013.01); *Y10T 428/2982* (2015.01)

(58) Field of Classification Search
CPC ......... C01F 7/002; C01F 7/007; C01B 25/163
See application file for complete search history.

(56) References Cited

U.S. PATENT DOCUMENTS

| | | | |
|---|---|---|---|
| 5,256,718 A | 10/1993 | Yamamoto et al. | |
| 5,965,639 A | 10/1999 | Yamauchi et al. | |
| 6,136,892 A | 10/2000 | Yamauchi et al. | |
| 6,207,736 B1 | 3/2001 | Nass et al. | |
| 6,365,071 B1 | 4/2002 | Jenewein et al. | |
| 2005/0286414 A1 | 12/2005 | Frischkemuth et al. | |
| 2006/0020064 A1 | 1/2006 | Bauer et al. | |
| 2006/0287418 A1* | 12/2006 | Bauer et al. | 524/127 |
| 2010/0224840 A1 | 9/2010 | Hawkes | |
| 2013/0190432 A1 | 7/2013 | Krause et al. | |
| 2014/0309339 A1 | 10/2014 | Schneider et al. | |
| 2014/0309340 A1 | 10/2014 | Schneider et al. | |
| 2014/0329933 A1 | 11/2014 | Schneider et al. | |
| 2014/0350149 A1 | 11/2014 | Schneider et al. | |
| 2014/0371361 A1 | 12/2014 | Bauer et al. | |
| 2015/0005421 A1 | 1/2015 | Schneider et al. | |
| 2015/0005427 A1 | 1/2015 | Bauer et al. | |
| 2015/0299419 A1 | 10/2015 | Bauer et al. | |

FOREIGN PATENT DOCUMENTS

| | | | |
|---|---|---|---|
| CA | 2 218 792 | | 4/1998 |
| CA | 2 246 124 | | 2/1999 |
| DE | 196 14 424 | | 10/1997 |
| DE | 197 34 437 | | 2/1999 |
| DE | 197 37 727 | | 7/1999 |
| EP | 0 896 023 | | 2/1999 |
| JP | H 02175604 | | 7/1990 |
| JP | 08-198609 | | 8/1996 |
| JP | 08198609 A | * | 8/1996 |
| JP | 2899916 | | 6/1999 |
| JP | 2011-225723 | | 11/2011 |
| JP | 2011225723 A | * | 11/2011 |
| WO | WO 2004/048453 | | 6/2004 |
| WO | WO 2012/045414 | | 4/2012 |

OTHER PUBLICATIONS

Machine Translation of JP2011-225723A. Nov. 10, 2011.*
Machine Translation of JP08-198609A. Aug. 6, 1996.*
Partial Written Translation of JP08-198609A. Aug. 6, 1996.*
Definition of mixed. http://www.thefreedictionary.com/mixed. As viewed on Jul. 20, 2016.*
PCT International Search Report for PCT/EP2012/004907, dated Feb. 4, 2013.
PCT International Preliminary Report on Patentability for PCT/EP2012/004907, dated Jun. 10, 2014.
English abstract for JPH 02175604 dated Jul. 6, 1990.

(Continued)

*Primary Examiner* — Stephen E Rieth
(74) *Attorney, Agent, or Firm* — Morgan, Lewis & Bockius LLP

(57) ABSTRACT

The invention relates to mixed alkali-aluminum phosphites of the formula (I)

$$Al_{2.00}M_z(HPO_3)_y(OH)_v x(H_2O)_w \qquad (I)$$

in which
M represents alkali metal ions,
z is 0.01 to 1.5,
y is 2.63 to 3.5,
v is 0 to 2,
w is 0 to 4;
to a process for preparation thereof and to the use thereof.

7 Claims, No Drawings

(56) References Cited

OTHER PUBLICATIONS

Yang Yall, Li Niu, Xiang Shouhe, Guan Naijia, "Hydrothermal synthesis and structure characteristics of single aluminophosphite [$Al_2(HPO_3)_3(H_2O)_3$]$H_2O$ crystals". Institute of New Catalytic Materials Science, Nankai University, Tianjin 300071, China, pp. 1-6. Oct. 2006.
United States Patent and Trademark Office Office Action for U.S. Appl. No. 14/362,886 dated Dec. 4, 2014.
United States Patent and Trademark Office Office Action for U.S. Appl. No. 14/362,886 dated Jun. 19, 2015.
United States Patent and Trademark Office Office Action for U.S. Appl. No. 14/362,886 dated Nov. 12, 2015.
United States Patent and Trademark Office Notice of Allowance for U.S. Appl. No. 14/362,886 dated Mar. 10, 2016.
United States Patent and Trademark Office Notice of Allowance for U.S. Appl. No. 14/362,886 dated Jun. 17, 2016.
Machine English Translation of JP 2899916, Jun. 2, 1999.
Machine English Translation of JP 2011-225723, Nov. 10, 2011.
United States Patent and Trademark Office Office Action for U.S. Appl. No. 14/362,881 dated Sep. 25, 2015.
United States Patent and Trademark Office Office Action for U.S. Appl. No. 14/362,881 dated Jun. 10, 2016.
Machine English Translation of JP 08-198609, Aug. 6, 1996.
Definition of extraneous. www.dictionary.com/extraneous as viewed on May 18, 2016.

\* cited by examiner

MIXED ALKALI-ALUMINUM PHOSPHITES, METHOD FOR PRODUCING SAME, AND THE USE THEREOF

The present invention relates to mixed alkali-aluminum phosphites, to a process for preparation thereof and to the use thereof.

The prior art discloses pure aluminum phosphites. These are microporous compounds similar to zeolites, in which aluminum ions and phosphite ions form a three-dimensional network of multimembered rings. They may contain water of crystallization or release water of crystallization with loss of the crystal structure and form anhydrates. According to the prior art, crystallization is effected by hydrothermal means, i.e. above the boiling point of water under the autogenous pressure thereof. To facilitate the crystallization (Yang. Shiyou Xuebao, Shiyou Jiagong (2006), 22(Suppl.), 79-81), polynitrogen compounds are added as structure-directing agents—also called templates. These disadvantageously remain within the product and are disruptive in the course of later use thereof.

The present invention relates, in contrast to the prior art, to mixed alkali-aluminum phosphites. These contain alkali metal ions in considerable molar proportions bound within the substance.

The invention also relates to mixtures of the aforementioned inventive mixed alkali-aluminum phosphites with alkali metal salts. These mixtures of mixed alkali-aluminum phosphites with alkali metal salts are not comparable with physical mixtures, merely because the alkali metal salts are not added by mixing but remain in the product from the reaction mixture of the preparation process, once the unwanted amounts of alkali metal salts have been removed by customary purifying processes.

It is therefore an object of the present invention to provide template-free mixed alkali-aluminum phosphites and mixtures of these mixed alkali-aluminum phosphites with alkali metal salts. It was a further object to provide a crystallization process which does not require the use of templates.

It has also been found that, surprisingly, the inventive mixed alkali-aluminum phosphites and the mixtures thereof with alkali metal salts are usable as synergists to flame retardants. The flame retardant synergists need not themselves be actively flame-retardant, but may significantly enhance the efficacy of flame retardants. These flame retardant synergists are used in flame retardant mixtures together with flame retardants. Typically, the flame retardant mixtures are mixed with further polymer additives by kneading and extrusion with the polymer to be rendered flame-retardant. The polymer mixture which forms is then flame-retardant and is typically processed further at a later stage to give polymer molding compositions or polymer moldings, etc. This processing operation is effected at temperatures at which the polymer is in molten form and which can distinctly exceed 320° C. for a brief period. Synergists must be able to withstand these temperatures without decomposition. It has now been found that, surprisingly, the inventive mixed alkali-aluminum phosphites are much more thermally stable than pure aluminum phosphites, i.e. they do not decompose until at higher temperatures and suppress harmful phosphine formation.

In the case of the known mixtures of aluminum phosphites with aluminum hydroxide, the active content of aluminum phosphite is lowered due to the simultaneous presence of aluminum hydroxide. The object of the invention, a maximum active content of aluminum phosphite, is also achieved by the inventive mixed alkali-aluminum phosphites.

In addition, the prior art discloses aluminum phosphite hydrates. A disadvantage is the elimination of water which occurs in the course of heating, which is a hindrance in the course of processing of the synergist to give a flame-retardant polymer. The object of the invention is achieved by the inventive mixed alkali-aluminum phosphites, by virtue of these being substantially free of water of crystallization.

The invention therefore relates to mixed alkali-aluminum phosphites of the formula (I)

$$Al_{2.00}M_z(HPO_3)_y(OH)_v x(H_2O)_w \quad (I)$$

in which
M represents alkali metal ions,
z is 0.01 to 1.5,
y is 2.63 to 3.5,
v is 0 to 2,
w is 0 to 4.

Preference is given to mixed alkali-aluminum phosphites in which
M is Na or K,
z is 0.10 to 1.2,
y is 2.75 to 3.1,
v is 0.05 to 0.5,
w is 0 to 1.

Particular preference is given to mixed alkali-aluminum phosphites in which
M is Na,
z is 0.15 to 0.4,
y is 2.80 to 3,
v is 0.1 to 0.4,
w is 0.01 to 0.1.

The inventive mixed alkali-aluminum phosphites preferably have a particle size of 0.1 to 1000 μm,
a solubility in water of 0.01 g/l to 10 g/l,
a bulk density of 80 to 800 g/l,
a residual moisture content of 0.1 to 5%
and a thermal stability with respect to $PH_3$ formation of 325 to 450° C.

The invention also relates to a process for preparing mixed alkali-aluminum phosphites as claimed in one or more of claims 1 to 4, which comprises crystallizing an aluminum source and a phosphite source in a solvent, by initially charging a nitrogen-free solvent and adding the aqueous solution of the aluminum source and an aqueous solution of alkali metal phosphite simultaneously, and metering in the aqueous solution of alkali metal phosphite at a rate of 10 to 100% of the amount of phosphite used per hour and the aqueous solution of the aluminum source at a rate of 10 to 100% of the amount of aluminum used per hour.

Preferably, the aluminum source comprises aluminum salts, aluminum chlorides, bromides, hydroxides, peroxides, peroxide hydrates, sulfites, sulfates, sulfate hydrates, hydrogensulfates, peroxosulfates, peroxodisulfates, nitrates, carbonates, percarbonates, stannates, borates, perborates, perborate hydrates, formates, acetates, propionates, lactates and/or ascorbates, and the phosphite source comprises alkali metal phosphites, alkaline earth metal phosphites, phosphorous acid, phosphorus trioxide, phosphorus trichloride and/or hypophosphites.

Preferably, the process for preparing mixed alkali-aluminum phosphites is executed at temperatures of 0 to 300° C., reaction times of $10^{-7}$ to $10^2$ h and pressures of 1 to 200

MPa, and the crystallization solution has a pH of 0 to 7 and a concentration of 1 to 50% by weight of solids in the suspension.

The invention also relates to the use of mixed alkali-aluminum phosphites as claimed in one or more of claims 1 to 4 as an intermediate for further syntheses, as a binder, as a crosslinker or accelerator in the curing of epoxy resins, polyurethanes and unsaturated polyester resins, as polymer stabilizers, as crop protection compositions, as sequestrants, as a mineral oil additive, as an anticorrosive, in washing and cleaning composition applications and in electronics applications.

Preference is given to the use of mixed alkali-aluminum phosphites as claimed in one or more of claims 1 to 4 as a synergist; as a synergist in flame retardant mixtures and in flame retardants, especially in flame retardants for clearcoats and intumescent coatings, in flame retardants for wood and other cellulosic products, in reactive and/or nonreactive flame retardants for polymers, for production of flame-retardant polymer molding compositions, for production of flame-retardant polymer moldings and/or for rendering polyester and pure and blended cellulose fabrics flame-retardant by impregnation.

The invention further relates to flame-retardant thermoplastic or thermoset polymer molding compositions and polymer moldings, films, filaments and/or fibers comprising 0.1 to 45% by weight of mixed alkali-aluminum phosphites as claimed in at least one of claims 1 to 4, 55 to 99.9% by weight of thermoplastic or thermoset polymer or mixtures thereof, 0 to 55% by weight of additives and 0 to 55% by weight of filler or reinforcing materials, where the sum of the components is 100% by weight.

More particularly, the invention relates to flame-retardant thermoplastic or thermoset polymer molding compositions and polymer moldings, films, filaments and/or fibers comprising 0.1 to 45% by weight of a flame retardant mixture composed of 0.1 to 50% by weight of mixed alkali-aluminum phosphites as claimed in one or more of claims 1 to 4 and 50 to 99.9% by weight of flame retardant, 55 to 99.9% by weight of thermoplastic or thermoset polymer or mixtures thereof, 0 to 55% by weight of additives and 0 to 55% by weight of filler or reinforcing materials, where the sum of the components is 100% by weight.

In this context, the mixed alkali-aluminum phosphite preferably contains up to 20% by weight of alkali metal salts.

The flame retardant in the flame-retardant thermoplastic or thermoset polymer molding compositions and polymer moldings, films, filaments and/or fibers preferably comprises dialkylphosphinic acids and/or salts thereof; condensation products of melamine and/or reaction products of melamine with phosphoric acid and/or reaction products of condensation products of melamine with polyphosphoric acid or mixtures thereof; nitrogen-containing phosphates of the formulae $(NH_4)_y H_{3-y} PO_4$ and $(NH_4 PO_3)_z$, where y is 1 to 3 and z is 1 to 10 000; benzoguanamine, tris(hydroxyethyl) isocyanurate, allantoin, glycoluril, melamine, melamine cyanurate, dicyandiamide and/or guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate.

The flame retardant more preferably comprises melam, melem, melon, dimelamine pyrophosphate, melamine polyphosphate, melam polyphosphate, melon polyphosphate and/or melem polyphosphate and/or mixed poly salts thereof and/or ammonium hydrogenphosphate, ammonium dihydrogenphosphate and/or ammonium polyphosphate.

Preferred flame retardants are also aluminum hypophosphite, zinc hypophosphite, calcium hypophosphite, sodium phosphite, monophenylphosphinic acid and salts thereof, mixtures of dialkylphosphinic acids and salts thereof with monoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof and adducts onto para-benzoquinone, or itaconic acid and salts thereof.

The inventive mixed alkali-aluminum phosphites preferably have a particle size of 1 to 500 μm and a bulk density of 200 to 700 g/l.

The inventive mixed alkali-aluminum phosphites preferably have an L color value of 85 to 99.9, more preferably of 90 to 98.

The inventive mixed alkali-aluminum phosphites preferably have an a color value of −4 to +9, more preferably of −2 to +6.

The inventive mixed alkali-aluminum phosphites preferably have a b color value of −2 to +6, more preferably of −1 to +3.

The color values are reported in the Hunter system (CIE-LAB system, Commission Internationale d'Eclairage). L values range from 0 (black) to 100 (white), a values from −a (green) to +a (red), and b values from −b (blue) to +b (yellow).

In principle, the inventive mixed alkali-aluminum phosphite may additionally contain up to 20% by weight of alkali metal salts.

Preferred alkali metal salts are salts with anions or oxo anions of the elements of the seventh main group, with anions or oxo anions of the elements of the sixth main group, with anions or oxo anions of the elements of the fifth main group, anions or oxo anions of the elements of the fourth main group, with anions or oxo anions of the elements of the third main group and/or anions of carboxylic acids.

Preferred aluminum sources are aluminum salts such as salts with anions or oxo anions of the elements of the seventh main group, with anions or oxo anions of the elements of the sixth main group, with anions or oxo anions of the elements of the fifth main group, anions or oxo anions of the elements of the fourth main group, with anions or oxo anions of the elements of the third main group and/or anions of carboxylic acids.

Preferred anions or oxo anions of the elements of the seventh main group are chlorides, complex chlorides and bromides.

Preferred anions or oxo anions of the elements of the sixth main group are hydroxides, peroxides, peroxide hydrates, sulfites, sulfates, sulfate hydrates, acidic sulfates, hydrogensulfates, peroxosulfates and peroxodisulfates.

Preferred anions or oxo anions of the elements of the fifth main group are nitrates.

Preferred anions or oxo anions of the elements of the fourth main group are carbonates, percarbonates and stannates.

Preferred anions or oxo anions of the elements of the third main group are borates, perborates and perborate hydrates.

Preferred anions of carboxylic acids are formates, acetates, propionates, lactates and ascorbates.

Preferred phosphite sources are alkali metal phosphites, alkaline earth metal phosphites, phosphorous acid or precursors thereof.

Preferred alkali metal phosphites are (di)sodium phosphites, sodium hydrogenphosphites and potassium phosphites.

Preferred alkaline earth metal phosphites are calcium phosphites.

Precursors are substances which can form phosphite ions under the conditions of the process, for example phosphorus trioxide ($P_2O_6$) which can form phosphorous acid under hydrolysis, phosphorus trichloride, or hypophosphite which can be converted to phosphite by oxidation.

Preferred reaction conditions are temperatures of 0 to 300° C., more preferably of 50 to 170° C., and reaction times of $10^{-7}$ to $10^2$ h. The pressure may vary between 1 Pa and 200 MPa (=0.00001 to 200 bar), preferably between 10 Pa and 10 MPa. Preference is given to an energy input of 0.083 to 10 kW/m$^3$, more preferably of 0.33 to 1.65 kW/m$^3$.

Preferred solvents are water, water of pH from 0 to 7, especially of pH from 1 to 5, acetic acid and protic organic solvents.

A preferred reaction methodology is to initially charge the aluminum source in a solvent and to meter in the phosphite source. In an alternative preferred reaction methodology, solvent is initially charged and aluminum source and phosphite source are metered in simultaneously.

The reaction methodology determines the concentrations of the reactants in the course of crystallization. This determines, for example, particle sizes and thermal stability of the products.

Preference is given to the use of the mixed alkali-aluminum phosphites and/or mixtures thereof with alkali metal salts as a flame retardant synergist.

Preference is given to flame retardant mixtures comprising 5 to 40% by weight of mixed alkali-aluminum phosphites as claimed in one or more of claims 1 to 4 and 60 to 95% by weight of flame retardant.

Preference is also given to flame retardant mixtures comprising 10 to 30% by weight of mixed alkali-aluminum phosphites as claimed in one or more of claims 1 to 4 and 70 to 90% by weight of flame retardant.

For the aforementioned use, especially flame retardant mixtures comprising 0.1 to 50% by weight of mixed alkali-aluminum phosphites as claimed in one or more of claims 1 to 4 and 50 to 99.9% by weight of dialkylphosphinic acids and/or salts thereof are used.

The flame retardant mixtures for the aforementioned use preferably comprise 5 to 40% by weight of mixed alkali-aluminum phosphites as claimed in one or more of claims 1 to 4 and 60 to 95% by weight of dialkylphosphinic acids and/or salts thereof.

The flame retardant mixtures for the aforementioned use more preferably comprise 10 to 30% by weight of mixed alkali-aluminum phosphites as claimed in one or more of claims 1 to 4 and 70 to 90% by weight of dialkylphosphinic acids and/or salts thereof.

Preference is given to a use in which the flame retardant mixture comprises 5 to 99.8% by weight of mixed alkali-aluminum phosphites of the formula (I), 0.1 to 94.8% by weight of dialkylphosphinic acids or salts thereof and 0.1 to 30% by weight of one or more polymer additives.

Preferred dialkylphosphinic acids or salts thereof are dialkylphosphinic salts of the formula (II)

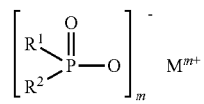
(II)

in which $R^1$, $R^2$ are the same or different and are each linear or branched $C_1$-$C_6$-alkyl;

M is Mg, Ca, Al, Sb, Sn, Ge, Ti, Fe, Zr, Zn, Ce, Bi, Sr, Mn, Li, Na, K, a protonated nitrogen base or hydrogen;

m is 1 to 4.

Preferred dialkylphosphinic salts are aluminum trisdiethylphosphinate, aluminum trismethylethylphosphinate, titanyl bisdiethylphosphinate, titanium tetrakisdiethylphosphinate, titanyl bismethylethylphosphinate, titanium tetrakismethylethylphosphinate, zinc bisdiethylphosphinate, zinc bismethylethylphosphinate and mixtures thereof.

Suitable further flame retardants are also particular nitrogen compounds (DE-A-196 14 424, DE-A-197 34 437 and DE-A-197 37 727). These are preferably those of the formulae (III) to (VIII) or mixtures thereof

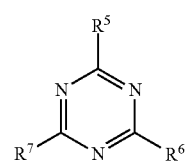
(III)

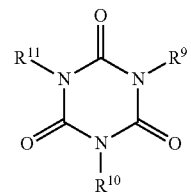
(IV)

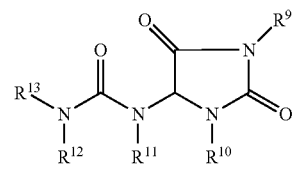
(V)

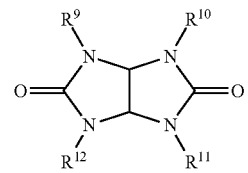
(VI)

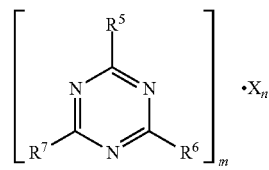
(VII)

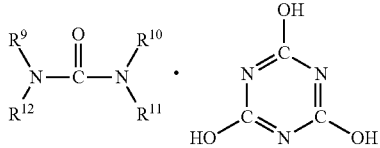

in which
R⁵ to R⁷ are each hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —OR⁸ and —N(R⁸)R⁹, both N-alicyclic and N-aromatic,
R⁸ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl,
R⁹ to R¹³ are the same groups as R⁸, and also —O—R⁸,
m and n are each independently 1, 2, 3 or 4,
X denotes acids which can form adducts with triazine compounds (II); or oligomeric esters of tris(hydroxyethyl) isocyanurate with aromatic polycarboxylic acids.

Particularly suitable flame retardants are benzoguanamine, tris(hydroxyethyl) isocyanurate, allantoin, glycoluril, melamine, melamine cyanurate, dicyandiamide and/or guanidine.

Suitable polymer additives for flame-retardant polymer molding compositions and polymer moldings are UV absorbers, light stabilizers, lubricants, colorants, antistats, nucleating agents, fillers, synergists, reinforcers and others.

Preference is given to the use of the inventive flame-retardant polymer moldings as lamp components such as lamp fittings and holders, plugs and multisocket extensions, bobbins, housings for capacitors and contactors, and circuit breakers, relay housings and reflectors.

The invention also relates to an intumescent flame-retardant coating comprising 1 to 50% by weight of the inventive mixed alkali-aluminum phosphites of the formula (I), and 50 to 99% by weight of ammonium polyphosphate, binder, foam former, fillers and polymer additives.

The intumescent flame-retardant coating preferably comprises 1 to 50% by weight of the inventive mixtures of mixed alkali-aluminum phosphites of the formula (I) with alkali metal salts, and 50 to 99% by weight of ammonium polyphosphate, binder, foam former, dialkylphosphinic acid salts, fillers and polymer additives.

The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LDPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$ to $C_9$), including hydrogenated modifications thereof (e.g. tackifier resins) and mixtures of polyalkylenes and starch.

The polymers are preferably polystyrene (Polystyrene 143E (BASF)), poly(p-methylstyrene), poly(alpha-methylstyrene).

The polymers are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate: more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The styrene polymers are preferably comparatively coarse-pore foam such as EPS (expanded polystyrene), e.g. Styropor (BASF) and/or foam with relatively fine pores such as XPS (extruded rigid polystyrene foam), e.g. Styrodur® (BASF). Preference is given to polystyrene foams, for example Austrotherm® XPS, Styrofoam® (Dow Chemical), Floormate®, Jackodur®, Lustron®, Roofmate®, Sagex® and Telgopor®.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin homo- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha,beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably also polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxide and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide), Nylon® 4/6, from DuPont), nylon 6 (polycaprolactam, poly-6-aminohexanoic acid, Nylon® 6, from DuPont, Akulon K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan A30, Durethan® AKV, Durethan® AM, from Bayer; Ultramid® A3, from BASF), nylon 6/9 (poly(hexamethylenenonanamide), Nylon® 6/9, from DuPont), nylon 6/10(poly(hexamethylenesebacamide), Nylon® 6/10, from DuPont), nylon 6/12 (poly(hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso- and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, polyamides or copolyamides modified with EPDM (ethylene-propylene-diene rubber) or ABS (acrylonitrile-butadiene-styrene); and polyamides condensed during processing ("RIM polyamide systems").

The polymers are preferably polyureas, polyimides, polyamidimides, polyetherimides, polyesterimides, polyhydantoins and polybenzimidazoles.

The polymers are preferably polyesters which derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates and polyester carbonates, and also polysulfones, polyether sulfones and polyether ketones.

Preferably, the polymers are crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins.

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the above-mentioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene), PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxymethylene/methacrylate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS (polybutylene terephthalate/polycarbonate/acrylonitrile-butadiene-styrene) and/or PBT/PET/PC (polybutylene terephthalate/polyethylene terephthalate/polycarbonate).

Suitable compounding units for production of polymer molding compositions are single-shaft extruders or single-screw extruders, for example from Berstorff GmbH, Hanover and from Leistritz, Nuremberg, and multizone screw extruders with three-zone screws and/or short compression screws, and twin-screw extruders, for example from Coperion Werner & Pfleiderer GmbH & Co. KG, Stuttgart (ZSK 25, ZSK30, ZSK 40, ZSK 58, ZSK MEGA-compounder 40, 50, 58, 70, 92, 119, 177, 250, 320, 350, 380) and/or from Berstorff GmbH, Hanover, Leistritz Extrusionstechnik GmbH, Nuremberg.

Also suitable are co-kneaders, for example from Coperion Buss Compounding Systems, Pratteln, Switzerland, e.g. MDK/E46-11D, and/or laboratory kneaders (MDK 46 from Buss, Switzerland), and also ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Suitable compounding units are also compounders with a contrarotatory twin screw, for example Compex 37 and 70 models from Krauss-Maffei Berstorff.

Inventive effective screw lengths (L) in the case of single-shaft extruders or single-screw extruders are 20 to 40D, in the case of multizone screw extruders, for example, 25D with intake zone (L=10D), transition zone (L=6D), ejection zone (L=9D), and in the case of twin-screw extruders 8 to 48D.

Production, processing and testing of flame-retardant polymer molding compositions and polymer moldings The flame-retardant components were mixed with the polymer pellets and any additives and incorporated in a twin-screw extruder (model: Leistritz LSM 30/34) at temperatures of 230 to 260° C. (PBT-GR) or of 260 to 280° C. (PA 66-GR). The homogenized polymer strand was drawn off, cooled in a water bath and then pelletized.

After sufficient drying, the molding compositions are processed on an injection molding machine (model: Aarburg Allrounder) at melt temperatures of 240 to 270° C. (PBT-GR) or of 260 to 290° C. (PA 66-GR) to give test specimens.

Test specimens of each mixture were used to determine the UL 94 fire class (Underwriter Laboratories) on specimens of thickness 1.5 mm. The UL 94 fire classifications are as follows:

V-0: afterflame time never longer than 10 sec, total of afterflame times for 10 flame applications not more than 50 sec, no flaming drops, no complete consumption of the specimen, afterglow time for specimens never longer than 30 sec after end of flame application V-1: afterflame time never longer than 30 sec after end of flame application, total of afterflame times for 10 flame applications not more than 250 sec, afterglow time for specimens never longer than 60 sec after end of flame application, other criteria as for V-0.

V-2: cotton indicator ignited by flaming drops, other criteria as for V-1. Not classifiable (ncl): does not fulfill fire class V-2.

Composition of the Mixtures of Mixed Alkali-Aluminum Phosphites

The sulfate content present after analysis is calculated as the alkali metal salt content (e.g. sodium sulfate). Remaining residual alkali metal (sodium here), aluminum and phosphorus (is calculated as phosphite) are converted to an empirical formula. The ion balance is established in the form of hydroxide ions. These results are reproduced in tables 1 to 3.

Test of Thermal Stability and Phosphine Formation

An important criterion for the thermal stability of the inventive mixtures of mixed alkali-aluminum phosphites is the temperature at which decomposition occurs and toxic phosphine ($PH_3$) is formed. The release thereof in the course of production of flame-retardant polymers must absolutely be avoided. For the determination, a material sample is heated in a tubular oven under flowing nitrogen (30 l/h), by raising the temperature stepwise. The decomposition temperature has been attained when a Dräager detection tube can detect more than 1 ppm $PH_3$ (short-term tube for hydrogen phosphide).

The invention is illustrated by the examples which follow. Amounts used, conditions, yields and analyses are reproduced in tables 1 to 3.

EXAMPLE 1

1080 g of water are heated to 100° C. and stirred in a 4 liter five-neck flask. Then 2 mol of aluminum sulfate solution (Al content 4.4% by weight) to which 349 g of 25% sulfuric acid have been added and 3 mol of sodium phosphite solution (39%) are pumped in simultaneously within 2 hours. The mixture is stirred at 100° C. for a further 20 h. The solids are filtered off, washed with hot demineralized water and dried. After further drying at 220° C. under nitrogen, the product still contains 0.3% residual moisture (muffle furnace at 300° C., 1 h). The product is x-ray-amorphous. The $^{31}P$ NMR indicates a 100% phosphite content. In a high yield, an inventive mixed alkali-aluminum phosphite is obtained with very high thermal stability ($PH_3$ formation from 360° C.).

EXAMPLE 2

Analogously to example 1, water is initially charged; aluminum sulfate solution and sodium phosphite solution to which 25% sodium hydroxide solution has been added are metered in at 100° C. while stirring over the course of 2 h, and the mixture is stirred for a further 16 h. The pH of the suspension is 4 and the nominal solids concentration is 5.6% by weight. In a high yield, an inventive mixed alkali-aluminum phosphite is obtained with very high thermal stability ($PH_3$ formation from 360° C.).

EXAMPLE 3

Analogously to example 1, 2 mol of aluminum sulfate solution and 3 mol of solid sodium phosphite are stirred at 100° C. for 6 h. The solids concentration is 22.8% by weight.

In a high yield, an inventive mixed alkali-aluminum phosphite is obtained with very high thermal stability ($PH_3$ formation from 360° C.).

EXAMPLE 4

3251 g of water are initially charged in a 16 l high-pressure stirred vessel, heated and stirred. Over the course of 3 h, 6 mol (3694 g) of aluminum sulfate solution and 9 mol (3055 g) of sodium phosphite solution are metered in simultaneously. The suspension is discharged and filtered at 80° C., washed with hot water, redispersed and washed once again. The filtercake is dried in a Reaktotherm drier at 220° C. In a very high yield, an inventive mixed alkali-aluminum phosphite is obtained with very high thermal stability ($PH_3$ formation from 380° C.).

EXAMPLE 5

Analogously to example 1, water is initially charged at 80° C. aluminum sulfate solution and sodium phosphite solution are metered in simultaneously within 2 h, and the mixture is stirred for a further 22 h. In a high yield, an inventive mixed alkali-aluminum phosphite is obtained with very high thermal stability ($PH_3$ formation from 360° C.).

EXAMPLE 6

Analogously to example 4, water is initially charged at 120° C. and aluminum sulfate solution and sodium phosphite solution are metered in within 1 h. In 89% yield, an inventive mixed alkali-aluminum phosphite is obtained with very high thermal stability ($PH_3$ formation from 360° C.).

EXAMPLE 7

Analogously to example 4, water is initially charged at 155° C. and aluminum sulfate solution and sodium phosphite solution are metered in within 0.5 h. The yield is 85% and the thermal stability ($PH_3$ formation from 360° C.) of the product is very high.

EXAMPLE 8

Analogously to example 1, water is initially charged at 100° C. and aluminum sulfate solution and sodium phosphite solution are metered in in excess within 2 h and the mixture is stirred for a further 22 h. In a good yield, an inventive mixed alkali-aluminum phosphite is obtained with very high thermal stability ($PH_3$ formation from 360° C.).

EXAMPLE 9

Comparative

Analogously to example 1, water is initially charged at 100° C. and aluminum sulfate solution in excess and sodium phosphite solution are metered in within 2 h. The yield and thermal stability ($PH_3$ formation from 340° C.) are reduced; the composition is not in accordance with the invention.

EXAMPLE 10

Comparative

Noninventive, commercially available aluminum phosphite shows a lower thermal stability in comparison ($PH_3$ formation from 320° C.).

TABLE 1

Reaction conditions and amounts used

| Example | Water [g] | Aluminum source [mol] | Phosphite source [mol] | $H_2SO_4$ 25% [g] | NaOH 25% [g] | Time [h] | Temperature [° C.] | pH | Solids concentration [%] |
|---|---|---|---|---|---|---|---|---|---|
| 1 | 1080 | 2 | 3 | 349 | | 22 | 100 | 1 | 10.0 |
| 2 | 1080 | 0.5 | 0.75 | | 5 | 18 | 100 | 4 | 5.6 |
| 3 | 0 | 2 | 3 | | | 6 | 100 | 2.8 | 22.8 |
| 4 | 3251 | 6 | 9 | | | 3 | 155 | 3.1 | 11.0 |
| 5 | 1080 | 2 | 3 | | | 24 | 80 | 2.6 | 11.0 |
| 6 | 3251 | 6 | 9 | | | 1 | 120 | 2.8 | 11.0 |
| 7 | 3251 | 6 | 9 | | | 0.5 | 155 | 2.4 | 11.0 |
| 8 | 1080 | 2 | 3.3 | | | 24 | 100 | — | 11.8 |
| 9 (comp.) | 1080 | 2 | 2.7 | | | 24 | 100 | — | 10.2 |
| 10 (comp.) | — | — | — | | | | | | |

TABLE 2

Yields

| Example | Yield [%] | $PH_3$ formation temperature [° C.] | Residual moisture content [% by wt.] | P content [% by wt.] | Al content [% by wt.] | Na content [% by wt.] | $SO_4$ content [% by wt.] |
|---|---|---|---|---|---|---|---|
| 1 | 95 | 360 | 0.3 | 30.7 | 17.9 | 2.3 | 0.5 |
| 2 | 94 | 360 | 0.35 | 32.4 | 17.0 | 1.2 | 0.23 |
| 3 | 96 | 360 | 1.8 | 27.5 | 16.8 | 4.2 | 5.9 |
| 4 | 98 | 380 | 0.27 | 30.7 | 18.0 | 1.5 | 0.29 |
| 5 | 93 | 360 | 1.13 | 29.7 | 18.3 | 0.7 | 1.2 |
| 6 | 89 | 360 | 0.49 | 29.0 | 18.5 | 1.9 | 1.9 |

TABLE 2-continued

Yields

| Example | Yield [%] | PH₃ formation temperature [°C.] | Residual moisture content [% by wt.] | P content [% by wt.] | Al content [% by wt.] | Na content [% by wt.] | SO₄ content [% by wt.] |
|---|---|---|---|---|---|---|---|
| 7 | 87 | 360 | 0.70 | 30.4 | 19.3 | 1.1 | 0.3 |
| 8 | 93 | 360 | 3.61 | 24.8 | 16.4 | 8.5 | 1.0 |
| 9 (comp.) | 75 | 340 | 4.90 | 24.3 | 18.3 | 0.1 | 13.4 |
| 10 (comp.) | | 320 | 0.00 | 31.62 | 18.36 | 0.0 | 0.0 |

TABLE 3

Composition of the end products

| Example | Ratio of P/Al [mol/mol] | Mixed alkali-aluminum phosphite empirical formula | A [% by wt.] | B [% by wt.] |
|---|---|---|---|---|
| 1 | 1.50 | $Al_{2.00}Na_{0.3}(HPO_3)_{2.99}(OH)_{0.32}$ | 99.0 | 0.7 |
| 2 | 1.53 | $Al_{2.00}Na_{0.14}(HPO_3)_{3.06}(OH)_{0.02}$ | 99.3 | 0.3 |
| 3 | 1.42 | $Al_{2.00}Na_{0.19}(HPO_3)_{2.85}(OH)_{0.49}$ | 89.4 | 8.9 |
| 4 | 1.49 | $Al_{2.0}Na_{0.18}(HPO_3)_{2.97}(OH)_{0.24}$ | 99.3 | 0.4 |
| 5 | 1.41 | $Al_{2.00}Na_{0.02}(HPO_3)_{2.83}(OH)_{0.36}$ | 97.1 | 1.8 |
| 6 | 1.37 | $Al_{2.00}Na_{0.13}(HPO_3)_{2.73}(OH)_{0.66}$ | 96.7 | 2.8 |
| 7 | 1.37 | $Al_{2.00}Na_{0.12}(HPO_3)_{2.74}(OH)_{0.63}$ | 98.9 | 0.4 |
| 8 | 1.32 | $Al_{2.00}Na_{1.15}(HPO_3)_{2.63}(OH)_{1.88}$ | 94.9 | 1.5 |
| 9 (comp.) | 1.16 | — | — | — |
| 10 (comp.) | 1.50 | $Al_2(HPO_3)_3$ | — | — |

A: mixed alkali-aluminum phosphite and alkali metal salt: AAP content
B: mixed alkali-aluminum phosphite and alkali metal salt: alkali metal salt content (sodium sulfate here)

The very small difference (in the addition of A and B) from 100% by weight corresponds to the very small residual moisture or water of crystallization content and is included in the empirical formula (I) with a very small index w.

Production of Flame-retardant Polymer Molding Compositions and Polymer Moldings

50% by weight of nylon 6,6 polymer, 30% by weight of glass fibers, 3.6% by weight of mixed alkali-aluminum phosphite according to example 4 and 16.4% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

50% by weight of polybutylene terephthalate polymer, 30% by weight of glass fibers, 3.6% by weight of mixed alkali-aluminum phosphite according to example 4 and 16.4% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

The invention claimed is:

1. A mixed alkali-aluminum phosphite of the formula (I)

$$Al_{2.00}M_z(HPO_3)_y(OH)_v x(H_2O)_w \tag{I}$$

wherein
M is alkali metal ions,
z is 0.01 to 1.5,
y is 2.63 to 3.5,
v is 0 to 2, and
w is 0 to 4,
wherein the mixed alkali-aluminum phosphate phosphite includes
a particle size of 0.1 to 1000 μm,
a solubility in water of 0.01 to 10 g/l,
a bulk density of 80 to 800 g/l, and
a thermal stability with respect to PH₃ formation of 325 to 450° C.

2. A synergist, a synergist in flame retardant mixtures and in flame retardants, a flame retardant for clearcoats and intumescent coatings, a flame retardant for wood and other cellulosic products, a reactive and nonreactive flame retardant for polymers, a flame-retardant polymer molding composition, a flame-retardant polymer molding or a polyester and pure and blended cellulose fabric flame-retardant produced by impregnation comprising a mixed alkali-aluminum phosphite of the formula (I)

$$Al_{2.00}M_z(HPO_3)_y(OH)_v x(H_2O)_w \tag{I}$$

wherein
M is alkali metal ions,
Z is 0.01 to 1.5,
y is 2.63 to 3.5,
v is 0 to 2, and
w is 0 to 4,
wherein the mixed alkali-aluminum phosphate phosphite includes
a particle size of 0.1 to 1000 μm,
a solubility in water of 0.01 to 10 g/l,
a bulk density of 80 to 800 g/l, and
a thermal stability with respect to PH₃ formation of 325 to 450° C.

3. A mixed alkali-aluminum phosphite of the formula (I)

$$Al_{2.00}M_z(HPO_3)_y(OH)_v x(H_2O)_w \tag{I}$$

wherein
M is alkali metal ions,
z is 0.01 to 1.5,
y is 2.63 to 3.5,
v is 0 to 2, and
w is 0 to 4,
wherein the mixed alkali-aluminum phosphite includes
a particle size of 0.1 to 1000 μm,
a solubility in water of 0.01 to 10 g/l,
a bulk density of 80 to 800 g/l,
a thermal stability with respect to PH₃ formation of 325 to 450° C., and
wherein the mixed alkali-aluminum phosphite has an SO₄ content of between 0.5 and 1.0% by weight.

4. A mixed alkali-aluminum phosphite as claimed in claim 3, wherein
M is Na or K,
z is 0.1 to 1.2,
y is 2.75 to 3.1,
v is 0.05 to 0.5, and
w is 0 to 1.

5. A mixed alkali-aluminum phosphite as claimed in claim 3, wherein
M is Na,
z is 0.15 to 0.4,
y is 2.80 to 3,
v is 0.1 to 0.4, and
w is 0.01 to 0.1.

6. A mixed alkali-aluminum phosphite as claimed in claim 3, selected from the group consisting of:
$Al_{2.00}Na_{0.3}(HPO_{03})_{2.99}(OH)_{0.32}x(H_2O)_{0-4}$;
$Al_{2.00}Na_{0.14}(HPO_{03})_{3.06}(OH)_{0.02}x(H_2O)_{0-4}$;
$Al_{2.00}Na_{0.19}(HPO_{03})_{2.85}(OH)_{0.49}x(H_2O)_{0-4}$;
$Al_{2.00}Na_{0.18}(HPO_{03})_{2.97}(OH)_{0.24}x(H_2O)_{0-4}$;
$Al_{2.00}Na_{0.02}(HPO_{03})_{2.83}(OH)_{0.36}x(H_2O)_{0-4}$;
$Al_{2.00}Na_{0.13}(HPO_{03})_{2.73}(OH)_{0.66}x(H_2O)_{0-4}$;
$Al_{2.00}Na_{0.12}(HPO_{03})_{2.74}(OH)_{0.63}x(H_2O)_{0-4}$; and
$Al_{2.00}Na_{1.15}(HPO_{03})_{2.63}(OH)_{1.88}x(H_2O)_{0-4}$.

7. A synergist, a synergist in flame retardant mixtures and in flame retardants, a flame retardant for clearcoats and intumescent coatings, a flame retardant for wood and other cellulosic products, a reactive and nonreactive flame retardant for polymers, a flame-retardant polymer molding composition, a flame-retardant polymer molding or a polyester and pure and blended cellulose fabric flame-retardant produced by impregnation comprising a mixed alkali-aluminum phosphite of the formula (I)

$$Al_{2.00}M_z(HPO_3)_y(OH)_vx(H_2O)_w \qquad (I)$$

wherein
M is alkali metal ions,
z is 0.01 to 1.5,
y is 2.63 to 3.5,
v is 0 to 2, and
w is 0 to 4,
wherein the mixed alkali-aluminum phosphite includes
a particle size of 0.1 to 1000 μm,
a solubility in water of 0.01 to 10 g/l,
a bulk density of 80 to 800 g/l,
a thermal stability with respect to $PH_3$ formation of 325 to 450° C., and
wherein the mixed alkali-aluminum phosphite has an $SO_4$ content of between 0.5 and 1.0% by weight.

* * * * *